(12) United States Patent
Oreman

(10) Patent No.: US 7,154,405 B2
(45) Date of Patent: Dec. 26, 2006

(54) USE INDICATOR

(76) Inventor: Gary Oreman, 17843 Argyll Ter., Boca Raton, FL (US) 33496

( * ) Notice: Subject to any disclaimer, the term of this patent is extended or adjusted under 35 U.S.C. 154(b) by 66 days.

(21) Appl. No.: 10/919,087

(22) Filed: Aug. 16, 2004

(65) Prior Publication Data

US 2006/0033632 A1   Feb. 16, 2006

(51) Int. Cl.
*G08B 21/00* (2006.01)
(52) U.S. Cl. .......... 340/660; 340/661; 340/691.6; 340/638
(58) Field of Classification Search ........ 340/660–662, 340/691.6, 693.5, 650, 652, 638
See application file for complete search history.

(56) References Cited

U.S. PATENT DOCUMENTS

| | | | |
|---|---|---|---|
| 3,927,399 A | 12/1975 | Fuzzell | |
| 4,711,368 A | 12/1987 | Simons | |
| 5,348,180 A | 9/1994 | Shepard | |
| 5,617,812 A | 4/1997 | Balderson et al. | |
| 5,633,592 A | 5/1997 | Lang et al. | |
| 5,755,712 A | 5/1998 | Szempruch et al. | |
| 6,014,301 A | 1/2000 | Schweitzer, Jr. | |
| 6,321,905 B1 | 11/2001 | Sykes | |
| 6,434,337 B1 | 8/2002 | Misawa et al. | |
| 6,452,501 B1 | 9/2002 | Tse et al. | |
| 6,456,046 B1 | 9/2002 | Gaza | |
| 7,019,658 B1 * | 3/2006 | Erickson et al. | 340/635 |

* cited by examiner

*Primary Examiner*—Daniel Wu
*Assistant Examiner*—Travis R. Hunnings
(74) *Attorney, Agent, or Firm*—Lerner, David, Littenberg, Krumholz & Mentlik, LLP

(57) ABSTRACT

The present invention relates to a use indicator apparatus having a power-sensing mechanism and an indicator. The indicator includes a first state and a second state wherein the indicator is maintained in the first state until a required amount of power is applied to the sensing mechanism. Upon reaching the required amount of power, indicator switches from the first state to the second state.

30 Claims, 3 Drawing Sheets

USE INDICATOR

BACKGROUND OF THE INVENTION

The present invention relates to a use indicator for an electrical device. The present invention enables one to determine whether an electrical device has been turned on at all or for at least a predetermined time. In particular, the present invention enables retailers to quickly assess whether a consumer who has purchased an electronic or electrical device has connected the device to a power supply at all or for at least a predetermined length of time.

Retail stores, and especially large retail stores, such as Home Depot, Wal-Mart, Target, and the like, generally have a consumer-friendly return policy. This policy permits the public to purchase an electrical device/appliance and return the device within a given timeframe, usually 30 days, and receive the purchase price in return. Unfortunately, for the retail stores, this only begins the saga of the returned product. In order to place the returned product back on the shelf, an employee of the retail store must ascertain whether the product is still "new." Usually the employee will open the package containing the product and make a determination whether to place the product back on the shelf or remove it from the consumer chain. The employee generally inspects the exterior of the packaging and will open it to make sure that all the contents are still in place. Additionally, at least a cursory review of the product is conducted to make sure that the product doesn't contain any scratches or imperfections, or any indication that it has been used, that would indicate the product should not be re-shelved.

Even with all of this review and inspection there is still a concern that a damaged product may be placed back on the store shelves for sale. This is because some consumers use the product for a given time or task and then return it when they no longer need the product and such use has caused damage to an area of the product that is not noticeable during only a cursory review. Therefore, many retail chains instruct their employees to err on the side of caution and discard any product that may seem damaged or used. This is done primarily because a retail store does not want to obtain a reputation that they are selling used products as new, and just as importantly, they don't want a secondary consumer, i.e., the person buying the re-shelved product, to be turned off to their store because after bringing home a product and opening its packaging, the consumer found out that someone had previously used it.

In either case, valuable employee time is consumed analyzing and reviewing returned products. Additionally, the retail store's reputation is at the mercy of their employees reviewing the returned products and making the correct judgment whether to re-shelve or not re-shelve the returned product.

On the other hand, if stores are too aggressive in discarding returned products because they are deemed no longer "new", many items that are truly unused may be permanently discarded and wind up in a refurbished store. This is because once a store determines that a product is no longer new they are prohibited from selling that product. The store must either return the product to the manufacturer for a rebate or sell the product through an alternate route such as a refurbished store, which sells the product at a lower price and keeps a portion of the proceeds for themselves. In either case, any profit that may have been realized by the sale of the unused product is greatly diminished or eliminated altogether as a result of this course of action.

SUMMARY OF THE INVENTION

The present invention is directed to a use indicator apparatus including a power-sensing mechanism and an indicator. The indicator preferably includes a first state and a second state. The indicator is contained in the first state until a required amount of power is applied to the sensing mechanism. Upon reaching the required amount of power, the indicator switches from the first state to the second state permanently. The power-sensing mechanism may sense a voltage and/or current.

The use of the apparatus may further include an electric cord having an electric plug and an electric wire. The indicator may be disposed on an electric cord or the electric plug. The use indicator may include a resistor and a fuse.

In order to switch from the first position to the second position, the sensing mechanism may have to be subjected to a power for a requiring time period before the indicator switches. The time period may be any time recommended, but preferably between 30 and 200 seconds. Additionally, before the indicator switches from the first state to the second state, an amount of threshold level of voltage may be required. The required threshold amount may be 110 volts for 30 seconds.

The indicator may include a dye packet that is maintained in the first state until the required power is applied to the indicator which thereby causes the dye packet to burst and switch to the second state.

In one embodiment, the indicator is viewable through a packet also included. In an additional embodiment, a required critical capacity must be met or exceeded before the indicator switches to the second state permanently.

The present invention may also include an electronic or electronic device having a use indicator apparatus. The apparatus including a power-sensing mechanism and an indicator having a first state and a second state. The indicator is preferably disposed on the electrical device. Additionally, the indicator is maintained in the first state until a required amount of power is applied to the sensing mechanism. Upon reaching the required amount of power, the indicator switches to the second state permanently. The electrical device may include a package for the electrical device. Further, the indicator may be positioned on the electrical device to be observable through the package.

The present invention also includes a method of determining whether an electrical or electronic product has been used at all or for a predetermined amount of time. The method includes providing a use indicator associated with the product. The use indicator having a first state indicating the product has not been in use at all or at least not in use for a predetermined period. The indicator also includes a second state indicating that the product has been in use or at least has been in use for a predetermined time. The method further includes observing the use indicator to determine whether the product has been used at all or for a predetermined period of time. The product may be a consumer product. The electrical or electronic product may include an electric plug and an electric wire, wherein the use indicator is provided on the electric wire or the electric plug. The product may be disposed in a package with the use indictor being viewable from outside the package. After the step of observing the use indicator, a determination may be made if the use indicator is in the first state that the product may be reshelved, while if the use indicator is in the second state, the product may not be reshelved.

DETAILED DESCRIPTION

The present invention is a use indicator for allowing the quick review and analysis of whether an electrical or electronic device has been used or even coupled to a power supply. The present invention may be adapted for any electrical device requiring a voltage input. This includes electrical appliances and consumer electronic products. Additionally, the present invention may be adapted for any product having a power supply.

Figure 1A:
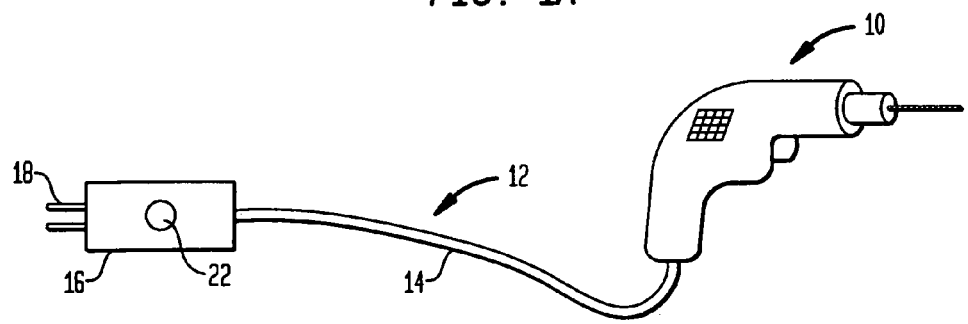
FIG. 1a illustrates a first embodiment of the present invention.

There is shown in FIG. 1a an electrical device, i.e., a drill 10, having an electric cord 12. Electric cord 12 includes wire 14, plug 16 and metal prongs 18, extending from plug 16. Electric cord 12 may be similar to any conventional electric cord associated with an electrical device and is specifically adapted for connecting the electrical device, i.e., drill 10, to an external power source (not shown in the figures).

Figure 1B:
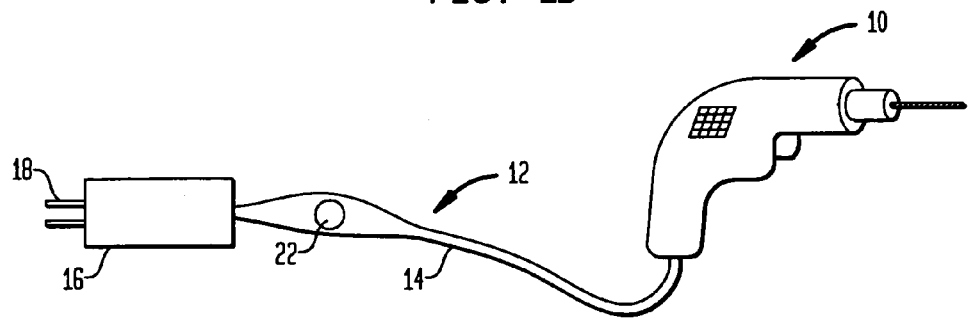
FIG. 1b illustrates a second embodiment of the present invention.
Figure 2:
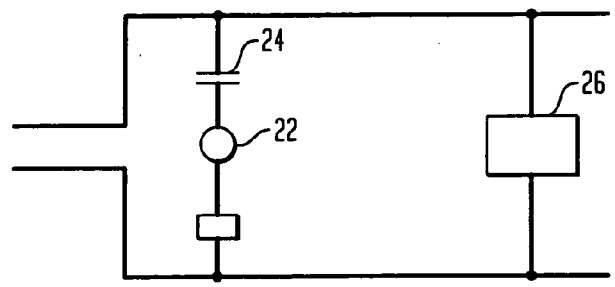
FIG. 2 illustrates one embodiment of the electronic circuitry of the present invention.

In an embodiment of the invention, electric cord 12 further includes use indicator 22 disposed on plug 16, as shown in FIG. 1a, or integral therewith. In an alternate embodiment as shown in FIG. 1b, indicator 22 is disposed on wire 14, or may be integrated therewith. Indicator 22 is ultimately in electrical communication with metal prongs 18 so that any voltage or current passing from metal prongs 18 to drill 10 will be sensed by indicator 22. In a preferred method of use, when metal prongs 18 are connected to an external power source, voltage passes to indicator 22. As shown in FIG. 2, indicator 22 includes a sensing mechanism 24 for detecting the voltage/current passing to drill 10.

Prior to being connected to an external power source, indicator 22 has a first state designated as a passive position. This passive position may include the absence of any outward indicia such as a marking, flag, specific color or other visible display. Additionally, the passive position, i.e., first state, may also be a location or orientation of a switch or other mechanism. The first state of indicator 22 signifies that drill 10 has not been used or at least has not been used longer than the designated thresholds, as will be described below. The presence of the first state enables a manufacturer, employee of a retail store or the like, as well as a purchasing consumer, to easily ascertain that the product, i.e., drill, is "new".

However, once metal prongs 18 have been connected to an external power source, voltage sensed by sensing mechanism 24 traveling through plug 16, may cause indicator 22 to switch from the first state to a second state. The second state of indicator 22 may be defined by an outward display such as a color marking, indicia or the like, as well as a mechanical location or position such as movement of a switch or blowing of a fuse. Once indicator 22 has been "tripped" to its second state, a person can now easily determine that drill 10 has been used. They simply have to locate indicator 22 disposed on plug 16, and observe the outward display. This greatly simplifies the job of the retail employee who can now quickly ascertain whether a returned product has been used or not. Of course, in order for the present invention to operate correctly, it is preferable that when indicator 22 is tripped to the second state it is permanent. Permanent here is defined as not being able to be reset by the consumer or even the retailer.

Although the present invention has been described with regard to specifically enabling sensing mechanism 24 to recognize voltage flowing to drill 10, the present invention may be adapted so that sensing mechanism 24 recognizes current flowing to the drill. Similar to before, once sensing mechanism 24 recognizes current flowing to the drill, or at least a predetermined minimum amount of current, indicator 22 is switched from the first state to the second state to signify that drill 10 has been connected to a power source.

As previously noted, indicator 22 may have a delay or a threshold that must be met or exceeded before the indicator switches from the first state to the second state. This threshold may either be associated with a time frame or a required voltage/current amount. The voltage threshold may either be defined as a critical value or a critical capacity. For example, the critical value may be equal to a given amount of voltage being received by sensing mechanism 24 at a given instance. In other words, if the critical value is 110 volts, the threshold voltage is not met or exceeded unless sensing mechanism 24 receives 110 volts or more instantaneously. The critical capacity may be defined as the amount of energy, i.e., voltage, sensing mechanism 24 may store before "tripping" indicator 22. Thus, sensing mechanism 24 may receive a low voltage amount over a period of time. The voltage is stored until sensing mechanism 24 reaches the critical capacity threshold, subsequently causing indicator 22 to switch from the first state to the second state. The voltage threshold enables a lower amount of voltage to be coupled to the drill 10 and still not "trip" the indicator. This provides the added benefit of permitting drill 10 to now be tested at the manufacturing plant using a lower voltage amount without tripping the use indicator 22. Although this feature has been described as having a threshold of 110 volts, any level of voltage may be employed as the threshold.

As discussed, sensing mechanism 24 and indicator 22 may be constructed such that they must be subjected to a voltage for a required amount of time before permitting indicator 22 to switch from the first state to the second state. Thus, if drill 10 were only connected to an external power source via power cord 12 for a limited amount of time, such as 30 seconds, indicator 22 would not trip. However, if drill 10 were used longer than the threshold time frame as, for example, 31 seconds, indicator 22 would be tripped. This enables the manufacturer, consumer, employee at the retail store and the like, to confidently determine that the appliance has not been used longer than the designated time frame. In use, the consumer may purchase drill 10 and prepare to use the drill at their house. However, after only using the drill for less than the minimum time frame, the user may decide that the drill does not fit their required needs and would like to return the drill. Upon bringing the drill back to the store from which it was purchased, an employee of the store may quickly ascertain whether the drill was used past its limiting threshold, and can still be designated as "new".

In a further embodiment of the present invention, the sensing mechanism may permit adjustment by the manufacturer and/or a retail store to the preferred voltage threshold and/or preferred time delay threshold. This adaptation of the present invention permits the manufacturer to determine for how long they wish their product to be "used" before indicator 22 moves from the first state to the second state. This is important because the voltage threshold and time delay threshold may depend on the type of electrical device and the nature of its use. For example, for items having simple electronic circuitry, a longer exposure time frame may still permit the reshelving of that product. However, for products that are more complex or may be contaminated after only one use, such as any electrical device used with food substances, the mere use of the product may destroy the product's integrity. Retail chains and manufacturers may decide to base their marketing and advertisements on how they monitor returned products. This fact will increase customer goodwill and the general appreciation of the manufacturer and retailer by the consumer.

Figure 3:
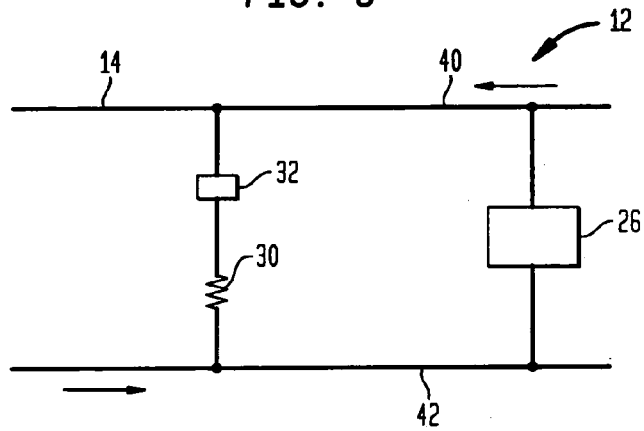
FIG. 3 illustrates a second embodiment of the electronic circuitry of the present invention.

Although numerous electrical circuits may be utilized in order to achieve the desired goal of the present invention, one possible electrical circuit that can be employed is illustrated in FIG. 3. The indicator and sensing mechanism include resistor 30 and fuse 32. Resistor 30 and fuse 32 are disposed on or within electric wire 14 between ground wire 40 and positive wire 42. Voltage flows in the direction illustrated by the arrows in the figure. One example of a working embodiment includes supplying 110 volts to the circuit. Resistor 30 is set at 100 ohms and fuse 32 has a capacity of 0.9 amps. Using Ohm's law when resistor 30 receives 110 volts it transmits 1 amp to fuse 32, causing the fuse to overload and trip. The "tripping" of fuse 32 corresponds to the indicator 22 switching from the first state to the second state. With the resistor in parallel with the electrical circuitry 26 of the drill, the drill may still operate correctly prior to and after fuse 32 trips.

Figure 4:
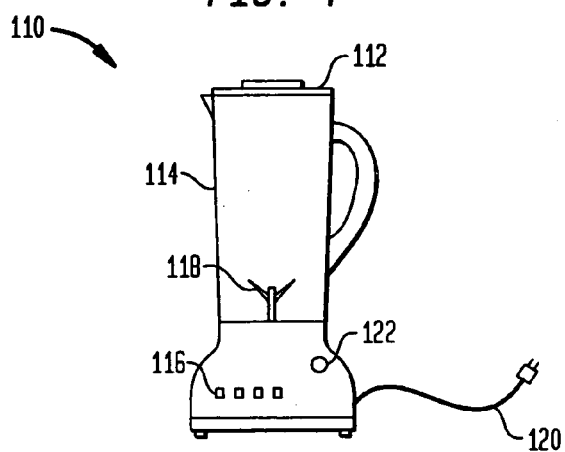
FIG. 4 illustrates an additional embodiment of the present invention.

As shown in FIG. 4, an alternate embodiment of the present invention is included with blender 110. Blender 110 may be any conventional blender sold on the market and include many of the same features. Specifically, blender 110 includes lid 112 and container 114 for receiving the liquids or solids to be blended. Additionally, blender 110 may include an assortment of buttons 116, which allow the blender to be adjusted to a desired speed or chopping technique to be performed by cutter 118. As with most conventional blenders, blender 110 also includes a power cord 120 for connection to an outlet (not shown in the figures). Blender 110 further includes indicator 122 disposed on an exterior of the blender or at least externably viewable.

Positioning indicator 122 on the product, i.e., blender, as opposed to the electric cord 112, is especially preferable for devices that have a removable power cord, such as personal computers. Otherwise, if indicator 122 were located on the removable power cord, a consumer may just replace the cord and return the product as unused, as apparently indicated by the new cord having a new indicator 22 in the first state.

Indicator 122, similar to the first embodiment of the present invention has a first state that may be thought of as a passive position. As before, this passive position generally may include the absence of any outward indicia such as a marking, flag, or other visible displays, though if one chooses the passive state can be visible as well as the second state. The first state of indicator 122 signifies that blender 110 has either not been used or at least has not used past a required threshold as described above. If indicator 122 in the first state is visible, such as a color, then indicator 122 would be a different color or absence of color in the second state.

Indicator 122 operates similar to indicator 22, with the first state of indicator 122 being maintained until a sufficient amount of voltage is supplied to blender 110 or a level of voltage has been sensed. Once the required voltage threshold is surpassed, indicator 22 may be "tripped" to the second state. One method of use may include a sensing mechanism 124 (shown in FIG. 5) coupled to the electronic circuitry 126 of blender 110. When power cord 120 is connected to a power supply, sensing mechanism 124 is subjected to a power source simultaneously with blender 110. Upon receiving the power voltage or current threshold, sensing mechanism 124 causes indicator 122 to switch from the first state to the second state defined by an outward indicia such as a color marking or other display.

With the indicator 122 in its second state, a person can easily determine that blender 110 has been used. They simply have to locate indicator 122 disposed on blender 110 and look at the outward display. If indicator 122 in the first state is visible, such as a color marking, then indicator 122 would be a different color or absence of color in the second state. This greatly simplifies the job of the retail employee who can now quickly ascertain whether a return product has been used or not. Although indicator 122 is shown on the front of blender 110, in a preferred embodiment, indicator 122 may be located at a non-obtrusive location on blender 110 or any other product. Such an example may include a bottom or back of the blender. This serves to maintain the general aesthetic appearance of the blender 110.

Figure 5:
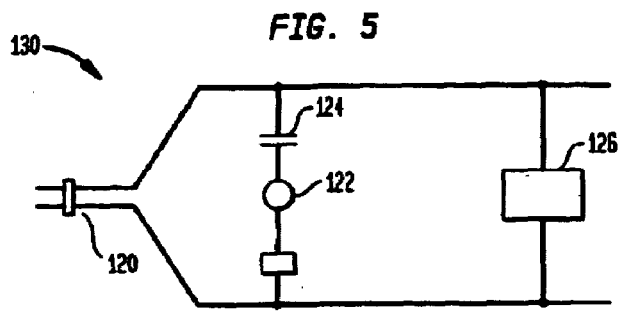
FIG. 5 illustrates an additional embodiment of the electronic circuitry of the present invention.

As shown in FIG. 5, sensing mechanism 124 and indicator 122 may be connected to an electronic circuit 126 of blender 110 in parallel with one end of circuit 130 being coupled to power cord 120. When power cord 120 is coupled to a power source, a voltage enters circuit 130 permitting blender 110 to operate. Additionally, as shown in the embodiment illustrated in FIG. 5, sensing mechanism 124, represented by a capacitor, is also subjected to the voltage flow. Upon receiving the voltage, sensing mechanism 124 may permit the voltage to flow to indicator 122, thereby causing indicator 122, which is pre-set in the first state, to switch to the second state. The capacitor, i.e., sensing mechanism 124 may be adjusted to allow a certain amount of voltage to enter circuit 130 before "tripping" indicator 122. This delay may either require a certain voltage quantity and/or for a required time. For example, a voltage of at least 110V for a minimum of thirty seconds may be required before indicator 122 is tripped. Although the present invention is described as being in parallel, circuit 130 may also be a series circuit.

Indicator 122 may include various electronic circuitry as well as mechanical operations that permit indicator 122 to move from the first state to the second state. One example of a mechanical operation may include a die packet 132 being included with indicator 122. In operation, when sensing mechanism 124 has recognized a voltage, meeting, or exceeding, the required threshold, the voltage flows to indicator 122 and die packet 132, causing the die packet to burst and leave a marking, observable on an exterior of blender 110, or on an electric cord if used with use indicator 122.

In alternate embodiments die packet 132 may be replaced by a diode that bursts when a threshold voltage is applied to it, or any other indicia that would indicate that indicator 122 has moved from the first state to the second state.

Figure 6:
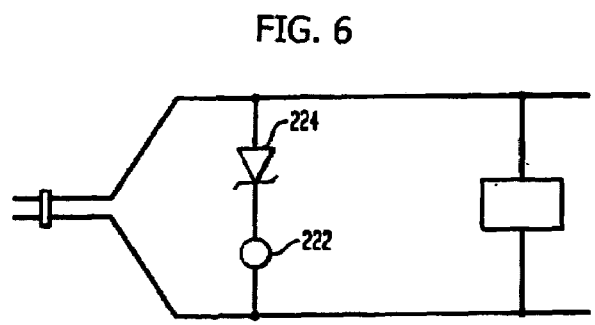
FIG. 6 illustrates an additional embodiment of the electronic circuitry of the present invention.

In an alternate embodiment as shown in FIG. 6, the sensing mechanism 224 may include a diode, which does not permit voltage to flow to indicator 222 until a required threshold is either met or exceeded.

Although the present invention has been described with only a few basic electronic circuitries, those skilled in the art will realize that sensing mechanism 24, 124 and indicator 22, 122 may include various embodiments of electronic circuitry as well as mechanical operations (such as a switch moving from a first position to a second position) with the key aspect being that indicator 22, 122 is switched from the first state to the second state only after a threshold of voltage or current is supplied to the electronic circuitry 30 of an electrical product; thus, easily permitting a person to ascertain whether the product, i.e., drill or blender, has been coupled to a power source. Further, indicator 22, 122 and sensing mechanism 24, 124 may be combined into a single entity as compared to distinct elements.

Additionally, although the present invention is described with reference to a voltage from a power outlet and power cord, the present invention may also be adapted for use with a battery supply or other alternate power sources.

Figure 7:
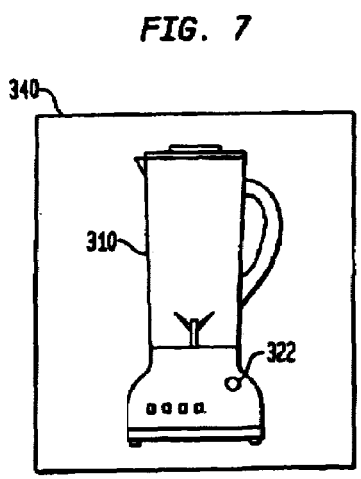
FIG. 7 illustrates an embodiment of the present invention contained within a package.

As is common with most electrical devices, a device may be contained within a package 340 when being sold. Thus, in an alternative embodiment as shown in FIG. 7, indicator 322 is preferably disposed on blender 310 so as to be viewable through package 340. The package 340 may have a cutout or a transparent material which permits the indicator to be seen from outside the package 340. This facilitates determining whether blender 310 has been coupled to a power source. Of course, the present embodiment may be adapted and combined with the first embodiment such that indicator 22 disposed on plug 16 is observable through packaging 340.

Some retail stores have a policy of sending all the returned consumer electronic and electrical products, or at least those of specified manufacturers, to the manufacture. In fact, the returned products go to a refurbisher who then sells the products as used or as new through other channels of trade. The present invention is particularly useful for a refurbisher, enabling the refurbisher to determine whether products have been used at all or for at least a predetermined time.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A use indicator apparatus comprising:
a power-sensing mechanism; and
an indicator having a first state and a second state, wherein said indicator is maintained in said first state until a required amount of power is applied to said sensing mechanism, and, upon reaching said required amount of power said indicator switches to said second state permanently.

2. The use indicator apparatus according to claim 1, wherein said power-sensing mechanism senses voltage.

3. The use indicator apparatus according to claim 1, wherein said power-sensing mechanism senses current.

4. The use indicator apparatus according to claim 1, further comprising an electric cord having an electric plug and electric wire, wherein said indicator is disposed on said electric plug.

5. The use indicator apparatus according to claim 4, wherein said indicator is disposed on said electric wire.

6. The use indicator apparatus according to claim 1, comprising a resistor and a fuse.

7. The use indicator apparatus according to claim 1, wherein said sensing mechanism is subjected to a power for a required time period before said indicator switches from said first state to said second state.

8. The use indicator apparatus according to claim 7, wherein said time period is between 30 seconds and 200 seconds.

9. The use indicator apparatus according to claim 1, wherein a required threshold level of voltage must be met or exceeded before said indicator switches from said first state to said second state.

10. The use indicator apparatus according to claim 9, wherein said required threshold amount is 110 volts for thirty seconds.

11. The use indicator apparatus according to claim 1, wherein said indicator includes a dye packet, said dye packet being maintained in said first state until said required power is applied to said indicator which thereby causes said dye packet to burst and switch to said second state.

12. The use indicator apparatus according to claim 1, further comprising a package, wherein said indicator is viewable through said package.

13. The use indicator apparatus according to claim 1, wherein a required critical capacity must be met or exceeded before said indicator switches to said second state permanently.

14. An electrical device including a use indicator apparatus, the apparatus comprising:
a power-sensing mechanism; and
an indicator having a first state and a second state, said indicator being disposed on the device, wherein said indicator is maintained in said first state until a required amount of power is applied to said sensing mechanism, upon reaching said required amount of power said indicator switches to said second state permanently.

15. The use indicator apparatus according to claim 14, wherein said indicator is disposed on an exterior of the device.

16. The use indicator apparatus according to claim 14, further comprising a package for the device, wherein said indicator is viewable through said package.

17. A combination electrical device having a use indicator and a package for such electrical device, comprising:
an enclosure at least partially defining the package;
a power-sensing mechanism; and
an indicator having a first state and a second state, wherein said indicator is maintained in said first state until a required amount of power is applied to said sensing mechanism, and, upon reaching said required amount of power said indicator switches to said second state permanently, wherein said indicator is viewable either on said enclosure or through said enclosure.

18. The combination electrical device and package according to claim 17, further comprising an electric cord having an electric plug and electric wire, wherein said indicator is disposed on said electric plug.

19. The combination use indicator and package according to claim 18, wherein said indicator is disposed on said electric wire.

20. An electronic or electrical device having a use indicator, said use indicator comprising:
a power-sensing mechanism; and an indicator having a first state and a second state, wherein said indicator is maintained in said first state until a required amount of power is applied to the sensing mechanism, upon reaching said required amount of power said indicator switches to said second state permanently.

21. The electronic or electrical device having a use indicator according to claim 20, wherein said device is a consumer product.

22. The electronic or electrical device having a use indicator according to claim 20, wherein the product is an appliance.

23. The electronic or electrical device having a use indicator according to claim 20 or 21, further comprising an electric cord having an electric plug and electric wire, wherein said indicator is disposed on said electric plug.

24. The electronic or electrical device having a use indicator according to claim 23, wherein said indicator is disposed on said electric wire.

25. A method of determining whether an electrical or electronic product has been used at all or for a predetermined time comprising:

providing a use indicator associated with such product which has a first state indicating that the product has not been in use at all or at least not in use for a predetermined time and a second state indicating that the product has been in use or at least has been used for a predetermined time such that if power is not provided to the product at all or for the predetermined amount of time, the indicator remains in the first state and if power is provided to the product at all or for the predetermined amount of time the indicator remains in the second state; and observing the use indicator to determine whether the product has been in use at all or for a predetermined time.

26. The method according to claim 25, wherein the product is a consumer product.

27. The method according to claim 25, further comprising an electric cord having an electric plug and an electric wire, wherein the use indicator is provided on the electric wire.

28. The method according to claim 27, further comprising an electric cord having an electric plug and an electric wire, wherein said indicator is disposed on said electric plug.

29. The method according to either claims 25 or 26, wherein the product is disposed in a package such that the use indicator is visible from outside the package, and the step of observing the use indicator includes observing the use indicator while the product is still within the package.

30. The method according to claim 25, wherein after the step of observing the use indicator, a determination is made if the use indicator is in the first state, the product may be reshelved, but if the use indicator is in the second state, the product may not be reshelved.

* * * * *